Figure 1:
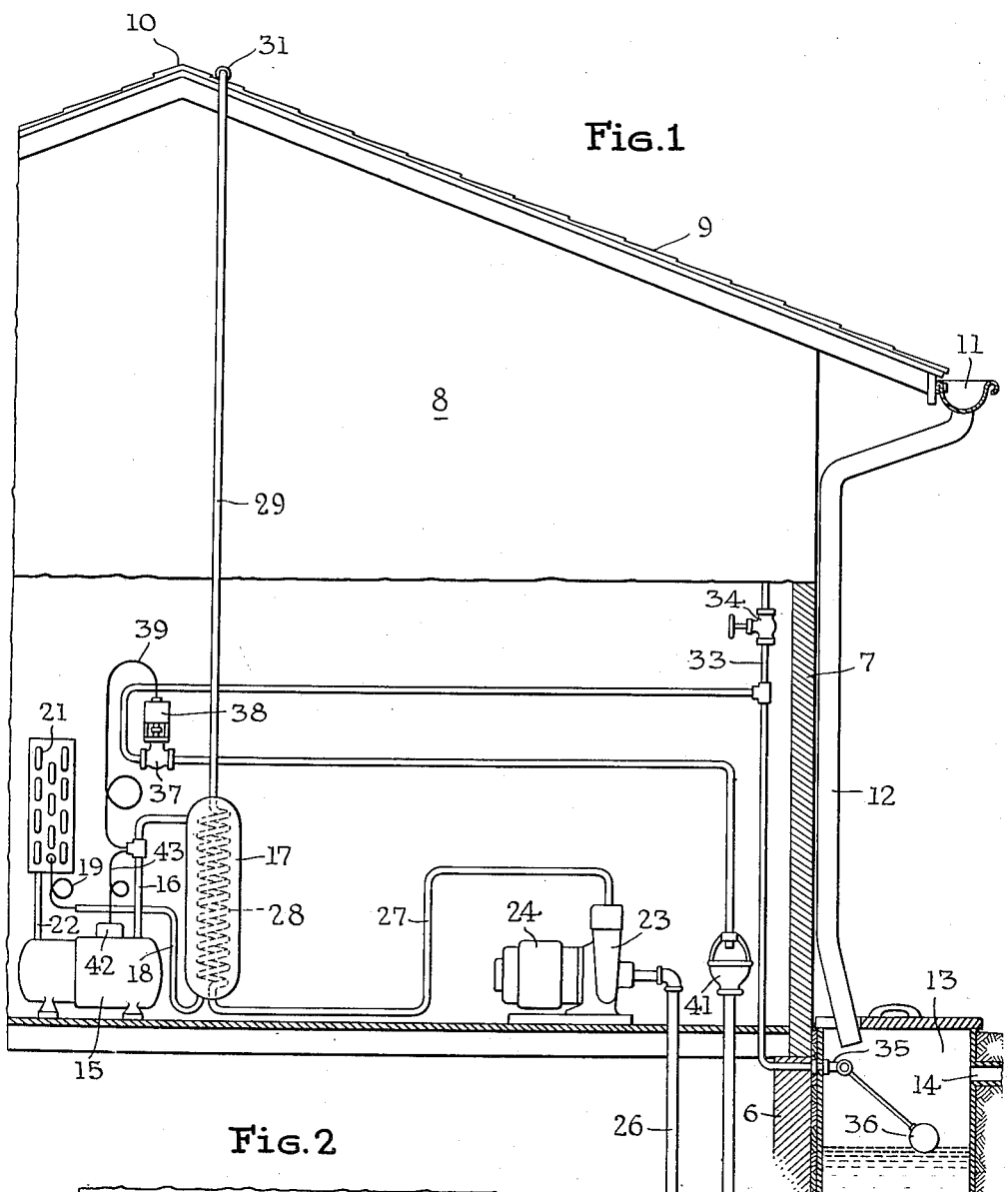

Dec. 1, 1953  C. M. GERHART, JR  2,660,863
RESIDENTIAL AIR CONDITIONING SYSTEM
Filed Jan. 16, 1953

INVENTOR
Carlton Mason Gerhart, Jr.

BY

ATTORNEYS

Patented Dec. 1, 1953

2,660,863

UNITED STATES PATENT OFFICE 2,660,863

RESIDENTIAL AIR CONDITIONING SYSTEM

Carlton Mason Gerhart, Jr., York, Pa., assignor to York Corporation, York, Pa., a corporation of Delaware Application January 16, 1953, Serial No. 331,614

6 Claims. (Cl. 62—6)

The present invention relates to summer air conditioning of small houses and is thought to offer its largest field of use in conditioning one story ranch type houses, because of the favorably large ratio of roof area to cubage.

Water cooling of the condenser of refrigerative circuits of a size suited to this duty is a virtual necessity. Wasteful use of city water is ordinarily out of the question. Spray ponds, conventional cooling towers and similar known installations are expensive and are objectionable in residential districts for many reasons.

The invention uses the roof of the house with its gutters and leaders to approximate the functions of a cooling tower, and attains several incidental advantages in addition to minimizing the amount of special apparatus for water cooling and recovery. The continuous cooling of the roof by keeping it wet intercepts a considerable portion of the sun load, and so reduces the size of refrigerating plant needed for a given house. Continuous wetting does no harm to a slate roof and actually prolongs the life of a composition roof, which deteriorates much faster when hot and dry than it does when wet and relatively cool.

A feature of the invention is the use of porous hose, conveniently a canvas tube, to diffuse water slowly and deliver it without significant velocity head near the ridge of the roof and preferably along the entire length of the ridge. Such a hose is self-regulating, easy and comparatively inexpensive to install, and never produces spray which on windy days would be a nuisance. It is so arranged and operated as to maintain a trickle of water over the whole roof or an appropriate portion thereof. The gutters and leaders deliver the unevaporated portion of this water to a sump from which a circulating pump draws cooling water, passes it through the condenser and again delivers it to the roof through the diffusing hose.

Make up water is normally delivered to the sump under control of a float valve responsive to the water level in the sump. However, if the head pressure in the refrigerative circuit rises above a chosen pressure (lower than that which would operate conventional safety devices to shut down the plant), a valve responsive to head pressure delivers make-up water directly to the circulating pump, and so has the effect of keeping the plant in action regardless of the response of the float valve. This is likely to happen if the plant is started up in the middle of a hot day, and may occur at other times when the load is abnormally heavy. In such case there will be some overflow from the sump but experience indicates that the pressure responsive valve rarely functions, so that this water-loss is not serious.

The essential elements of a system which as a result of tests is known to operate satisfactorily is shown in the accompanying drawing, in which Fig. 1 is a view part in end elevation and part in vertical section of a one story house equipped according to the invention.

Figure 2:
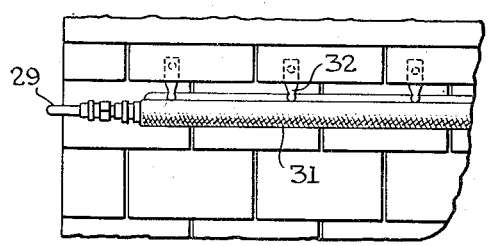

Fig. 2 is a fragmentary view showing how the diffusing hose is mounted.

In Fig. 1 a portion of a house is illustrated. Part of the footings appear at 6, a side wall at 7, an end gable wall at 8 and a portion of a gable roof at 9. The roof is indicated to be of slates or composition shingles, but it could be of sheet metal or any other suitable material and of any form provided it has pitch enough to cause water to flow preferably rather slowly, to the eaves troughs, one of which appears at 11.

To simplify illustration, the drawings show the water trickling scheme applied only at one side of the ridge 10, but in practice use of the entire roof, or as large areas thereof as can be conveniently included is preferred. All that is involved is possible duplication of water diffusers and collecting eaves troughs. Complete systems of eaves troughs are commonly a part of the house.

A leader 12 receives water from the eaves trough 11 and delivers it to sump 13 which has an overflow 14, to a sewer or any convenient point of disposal. If there is more than one leader draining roof used according to the invention, they should all discharge into sump 13. In this way all trickled water is fed to the sump, and so is rain-water. Excess from any source is drained away.

The refrigerative circuit comprises a sealed motor-compressor unit 15 which delivers through hot gas line 16 to the interior of the condenser shell 17. Liquid condensed in shell 17 passes by liquid line 18 and restrictor 19 (typical of any device for controlling evaporation), to the refrigerative evaporator 21. This is a finned tube unit connected to the suction line 22 leading to the compressor intake.

The evaporator 21 typifies the summer conditioner for air in the interior of the house. It cools and dehumidifies the air by heat exchange with the air. The desired heat exchange customarily is stimulated and distribution is improved by a circulating fan and a related duct system. Such details are conventional and subject to wide variations dependent on the particular installation. Since these are not involved in the invention, only the evaporator—the indispensable component—is illustrated.

A centrifugal pump 23 driven by a motor 24 draws water from sump 13 through strainer 25 and suction line 26 and discharges it through line 27, and condenser cooling coil 28 to line 29. Line 29 delivers the water, heated by passage through coil 28 to a canvas or other porous tube 31, closed at its remote end and attached to roof 9 just below ridge 10 by clips 32. Water diffuses through the tube 31 and trickles down the roof to the eaves trough 11. A part evaporates and cools the rest on principles well understood in the art.

An important feature of the system is the arrangement for supplying the make-up water. A water supply line 33 controlled by a normally open stop valve 34 delivers water to sump 13 through a valve 35 actuated by float 36. Valve 35 is the normal control for make-up water. When there is no occasion for gradual change of water, the float valve will respond to a water level well below the overflow, leaving considerable water-storage capacity.

A branch of line 33 leads through pressure operated valve 37. This valve is biased to close but may be forced open by motor 38, when the motor is subject to pressure above a certain value. A tube 39 subjects motor 38 to the head pressure in the refrigerative circuit, i. e., the pressure in line 16 and condenser 17. Water passing valve 37 is delivered to an open funnel 41 and flows thence to pipe 26, so that any such water is drawn by the pump 23, in preference to the usually warmer water in sump 13.

Refrigerative systems customarily include some means to shut them down in case of derangement. Such a stop unit is indicated at 42. An indispensable component of such a safety device is one responsive to excessive head pressure. Hence a line 43 is shown leading from hot gas line 16 to the stop unit 42 to subject the device to head pressure. The device 42 may also function in response to other conditions, but the significant aspect, so far as the present invention is concerned, is the fact that valve 38 is so loaded that it starts to open at head pressures significantly lower than that necessary to trip the stop device 42.

The invention affords the water saving characteristics of spray ponds and cooling towers. It requires almost no expensive apparatus, particularly no noisy fan, is not a hazard to children, is unlikely to collect trash and involves no spray nuisance. It is not unsightly and indeed is almost invisible. It actually reduces the refrigerative load by intercepting heat at the roof surface.

Normally the float valve 35 controls the make-up water. Under abnormal load conditions the valve 37 will furnish cool water to the condenser if head pressure starts rising and approaches the stop limit. It thus serves to keep the plant in operation until it gets control of the load, as it usually can do in a reasonable time.

The invention can be used with any building or any part of a building having an adequate trickle surface and with any refrigerative plant using a water-cooled condenser. While a canvas tube water diffuser is considered functionally ideal and desirably inexpensive, the essential thing is to deliver the water so as to assure film flow and avoid spray which might be dispersed by winds.

What is claimed is:

1. The combination of a house having a roof which is inclined sufficiently to cause water to flow across it from a higher to a lower portion; water collecting means for receiving water which flows from said lower portion; a refrigerative conditioning plant for the interior of said house, said plant having a high side including a condenser of the water cooled type; water distributing means for discharging water to the higher portion of the roof; a motor driven pump; connections whereby said pump passes water derived from said collecting means first in cooling relation with said condenser and then through said distributing means to the roof; means responsive to depletion of the water supply in said collecting means for delivering make-up water; and means responsive to excess pressure in said high side for delivering make-up water directly to said pump.

2. The combination of a house having a roof which is inclined sufficiently to cause water to flow across it from a higher to a lower portion; water collecting means for receiving water which flows from said lower portion; a refrigerative conditioning plant for the interior of said house, said plant having a high side including a condenser of the water cooled type; water distributing means for discharging water to the higher portion of the roof; a motor driven pump; connections whereby said pump passes water derived from said collecting means first in cooling relation with said condenser and then through said distributing means to the roof; means responsive to depletion of the water supply in said collecting means for delivering make-up water; means responsive to excess pressure in said high side for delivering make-up water directly to said pump; and means responsive to a still higher pressure in said high side for shutting down the refrigerative plant.

3. The combination of a house having a roof which is inclined sufficiently to cause water to flow across it from a higher to a lower portion; water collecting means for receiving water which flows from said lower portion; a refrigerative conditioning plant for the interior of said house, said plant having a high side including a condenser of the water cooled type; a porous tube extending along the higher portion of the roof; a motor driven pump; connections whereby said pump passes water derived from said collecting means first in cooling relation with said condenser and then through said porous tube to the roof; means responsive to depletion of the water supply in said collecting means for delivering make-up water; and means responsive to excess pressure in said high side for delivering make-up water directly to said pump.

4. The combination defined in claim 3 in which the porous tube is formed of a pervious textile fabric.

5. The combination of a house having a roof which is inclined sufficiently to cause water to flow across it from a higher to a lower portion; water collecting means, including a sump, for receiving water which flows from said lower portion; a refrigerative conditioning plant for the interior of said house, said plant having a high side including a condenser of the water cooled type; diffusing means for delivering water without significant velocity head to said roof over the higher portions thereof; a motor driven pump; connections whereby said pump may pass water derived from said sump, first in cooling relation with said condenser and then through said diffusing means to said roof; means responsive to lowered water level in the sump for delivering make-up water; and means responsive to excess pressure in said high side for independently delivering make-up water.

6. The combination defined in claim 5 in which the sump has an overflow, the means responsive to lowered level responds only to a level a substantial distance below said overflow, so that the sump normally has reserve capacity without overflowing, and the means responsive to excess pressure is arranged to deliver make-up water at a point in the water path between the sump and the condenser.

CARLTON MASON GERHART, Jr.

References Cited in the file of this patent

UNITED STATES PATENTS

| Number | Name | Date |
|---|---|---|
| 964,464 | Crawford-Frost | July 12, 1910 |
| 1,273,577 | Carroll | July 23, 1918 |